United States Patent [19]

Ishikawa et al.

[11] Patent Number: 5,646,935
[45] Date of Patent: Jul. 8, 1997

[54] HIERARCHICAL QUADRATURE FREQUENCY MULTIPLEX SIGNAL FORMAT AND APPARATUS FOR TRANSMISSION AND RECEPTION THEREOF

[75] Inventors: Tatsuya Ishikawa; Takashi Seki, both of Kanagawa-ken, Japan

[73] Assignee: Kabushiki Kaisha Toshiba, Kawasaki, Japan

[21] Appl. No.: 405,625

[22] Filed: Mar. 15, 1995

[30] Foreign Application Priority Data

Mar. 15, 1994 [JP] Japan .................................. 6-043579

[51] Int. Cl.$^6$ ............................................. H04J 15/00
[52] U.S. Cl. ............................................. 370/207; 375/261
[58] Field of Search ................................ 370/8–11, 106, 370/107, 108, 18, 85.13, 79, 110.1, 30, 57, 69.1, 105.1, 95.1, 94.1; 375/200, 202, 208, 209, 210, 235, 242, 241, 243, 245, 254, 346, 354, 237, 238, 239, 244, 261, 269, 271, 272, 278, 298, 296, 303, 323, 324, 334

[56] References Cited

U.S. PATENT DOCUMENTS 5,428,610  6/1995  Davis ........................................ 370/11

OTHER PUBLICATIONS

Le Floch et al., "Digital Sound Broadcasting to Mobile Receivers", IEEE Transactions on Consumer Electronics, vol. 35, No. 3, pp. 493–503, Aug. 1989.

Monnier et al., "Digital Television Broadcasting With High Spectral Efficiency", IBC Proceedings, No. 358, pp. 380–384, Jul. 1992.

Tsuzuku et al., "A Study of the Modulation and the Transmission Capacity for the Digital Terrestrial TV Broadcasting", ITE Technical Report, vol. 17, No. 54, pp. 7–12.

*Primary Examiner*—Dang Ton
*Attorney, Agent, or Firm*—Cushman, Darby & Cushman IP Group of Pillsbury Madison & Sutro LLP

[57] ABSTRACT

A hierarchical quadrature frequency multiplex signal transmission apparatus that produces a plurality of modulated signals in which multiple layers of hierarchical information data are associated with a plurality of hierarchically graded modulation forms. The apparatus also interleaves symbols within a frame of the hierarchical information data in both a time axis and a frequency axis. In addition, the apparatus may differentially encode one of the hierarchically graded modulation forms. Further, the apparatus performs an inverse Fourier transform on the symbols, by associating each of the plurality of hierarchically graded modulation forms with a corresponding predetermined carrier. Also disclosed is an apparatus for receiving the hierarchical quadrature frequency multiplex signal and the format of the hierarchical quadrature frequency multiplex signal.

16 Claims, 17 Drawing Sheets

TRANSMISSION SEQUENCY
OF INTERLEAVED DATA
(CASE-2)

(a) 16QAM CONSTELLATION (b) 64QAM CONSTELLATION (c) 8PSK CONSTELLATION (d) 32QAM CONSTELLATION 5,646,935

HIERARCHICAL QUADRATURE FREQUENCY MULTIPLEX SIGNAL FORMAT AND APPARATUS FOR TRANSMISSION AND RECEPTION THEREOF

FIELD OF THE INVENTION

The present invention relates to a digital transmission system capable of a hierarchical transmission in an quadrature frequency multiplex modulation, and a modulating apparatus and a demodulating apparatus therefor.

BACKGROUND OF THE INVENTION

An quadrature frequency multiplex signal transmission system, which is generally called to as QFDM (Quadrature Frequency Division Multiplex) modulation or CQFDM (Coded QFDM; "Coded" means channel coding for error correction) modulation, is one of digital modulation techniques which is planed to be adopted for use in digital audio broadcasting (referred to as DAB) by the ITU-R (ex-CCIR) in near future. The details of this technique are described in the contribution document (TG11/3) issued from ITU-R and the Report of the Television Society, Vol. 17, No. 54, pp. 7-12, BCS 93-33 (September 1993). These previous designs will be discussed in the scope relevant to the present invention.

Since one symbol of QFDM is composed of carriers of several hundreds through several thousands, it is possible to carry out interleaving in both the time and frequency domains of the symbol. Because there is no lack of continuous data by applying interleaving, even when a reception had failed for a length of time, the possibility of restoring data is heightened through an error correction process at a receiver section. Similarly the possibility of restoring data through the error correction process at the receiver section can be enhanced, since, even if carriers over a certain range of frequency had failed by selective fadings caused by a multipath, etc., the interleaving can restore the lack of continuous data. The time interval of the frame is defined in accordance with transmission conditions of the frame, so that a required depth of interleaving should be obtained.

There are some examples of the QFDM transmission system as proposed by the DAB, which employ such interleaving in both the time and frequency domains in consideration of the poor receiving conditions of mobile radio communications. This means that the frame consisting of several hundred symbols is altered so that the arrangement of the symbols in conformity with a prescribed rule.

As shown in FIG. 1 a frame comprised of 300 symbols and 448 carriers is constructed in time and frequency directions respectively. The first symbol is a null symbol (zero magnitude for all the carriers) that is used for synchronizing operations in the receiver section and the second symbol is an equalization reference symbol that is used for removing multipath signals. Then comes a symbol comprised of fixed data that is used for controlling signal transmission parameters, which is followed by information data (i.e., symbols of effective data). The interleaving is performed using a RAM (Random Access Memory) that is associated with this frame and is provided at the transmitter section. Using the RAM, a write-in operation is made in a prescribed sequential order, and then a read-out operation is performed in a sequence that differs from the write-in order. FIG. 1 represents an instance where plural audio channels (33 channels) are transferred simultaneously with an effective data period that is divided into 33 equal parts. Non-multiplexed signal transmission is handled in a similar manner.

FIGS. 2 and 3 respectively show block diagrams of a transmitter and a receiver both associated with the above-mentioned conventional transmission system.

In FIG. 2, a 2-bit information data that is input into an input terminal 1 is transformed by a constellation mapper 2 into a four-phase QPSK constellation signal. The constellation in this context means a representation, in a complex vector plane, of the in-phase axis component and quadrature axis component in an quadrature modulation. In case of QPSK, the constellation has concentrically arranged four symbols with equidistant intervals therebetween, as shown in FIG. 15. These constellation signals are collected in a frame as shown in FIG. 1 and are written into an interleaver 3, which is comprised of memories. For simplicity of explanations, the symbol in the constellation signal in each QFDM carrier will be referred to as "modulation symbol of each carrier", while the symbol in the QFDM signals, i.e., the symbol in all the carriers, will be referred to as "QFDM modulation symbol" or may simply referred to as "symbol". In other words, one element in the two-dimensional plane, as shown in FIG. 1, is the modulation symbol of each carrier, while the respective columns correspond to the QFDM modulation symbols. The coherent symbols (null and equalization reference symbols) are inserted into the interleaver 3, where they are read out in conformity with a specific rule. The interleaved outputs are differentially encoded by a differential encoder 4. The differential encoding is a method for transmitting information by a phase difference between two consecutive symbols, thus characterized in that it needs no absolute reference signal. This differential encoding should be performed for each carrier in the QFDM transmission. That is, processing is to be made in such a manner that the differential encoding is carried out for two consecutive symbols along the column direction, as shown in FIG. 1. DAB has proposed mainly this sort of differential encoding. Then the differentially encoded output is transformed from a frequency domain into a time domain for every modulation symbol in an inverse FFT circuit 5. The respective columns, as shown in FIG. 1, are output as time domain waveform for a certain period of time. Note that this output is in general a complex signal. After a guard symbol period, which is used for preventing the inter-symbol interference by multipath is inserted by a guard symbol inserter 6, the complex signal is converted into an analog waveform by digital-analog converters 7a and 7b. This is followed by frequency conversion by the quadrature modulator. This conversion occurs after the analog waveform has been band-limited by LPFs 8a and 8b. The quadrature modulator comprises mixers 10 and 11, a 90° phase shifter 12, a local oscillator 13 and a mixer 14. Taking the complex signals output from the inverse FFT circuit 5 as in-phase axis component I signal and quadrature axis component Q signal, this modulator synthetically modulates them by local oscillator output with a zero phase and that with a ninety degree phase. The output of the quadrature modulator is an intermediate frequency signal (referred to as IF signal). The IF signal is band limited by a BPF 15 (such as a SAW filter), amplified by an amplifier 16, and then frequency converted in the section comprising of a mixer 17 and a local oscillator 18. The resulting signal will be output as a radio frequency signal (referred to as RF signal).

Referring now to FIG. 3 a block diagram of the receiver associated with the above-mentioned transmission system will be explained hereinafter.

The RF signal is input into an input terminal 31 and is band limited at a BPF 32. A desired signal is then selected at a channel tuner that is comprised of a mixer 34 and a variable local oscillator 35. The desired signal has passed through an amplifier 33 and has been band limited at the BPF 32. After being band limited by a BPF 37 (such as a SAW filter), the signal passes through a variable gain amplifier 38 and is detected at a quadrature detector comprising of mixers 39 and 40, a 90° phase shifter 41 and a variable local oscillator 53. This output is equivalent to the I and Q signals at the transmitter section. After being band limited at LPFs 42 and 43, these signals are digitized respectively at analog-digital converters 44 and 45 so as to be converted into complex digital signals. The digital signals are distributed, and one of the distributed signals is fed to an envelope detector 46 so as to be used as a control signal for an automatic gain control (referred to as AGC) amplification. The other distributed signal is fed to an FFT circuit 51 through guard symbol removers 49 and 50, and thus each symbol of the signal in the time domain is transformed into the signal in the frequency domain (symbol associated to each column in FIG. 1). Further, the complex digital symbol as distributed is fed to a sync. signal extractor 47 so as to detect the symbol and frame synchronization using the null symbol and equalization reference symbols. The detected output is input into a timing generator 48 so as to recover clock and timing signals required for respective signal processors.

After the guard period symbol is removed at guard symbol removers 49 and 50, the signal processed by the FFT circuit 51 is decomposed into modulation symbols for respective carriers, and then equalized for each carrier at an equalizer 55 and an equalization reference symbol detector 56. Further, a delay or differential detector 57 detects phase difference information (most of the DAB proposed methods do not generally need this equalization, it is referred to here, however, to clearly differentiate it from the present invention). As stated above, the information is transferred only by the constellation phase difference in the differentially encoded QPSK modulation, this phase difference is detected by this detector. As a general rule the differential detector 57 is made of a simple differential detector. Next, the differential detection output is restored into the initial frame construction by a deinterleaver 58 that carries out the inverse process of interleaving that was performed at the transmitter section. Furthermore, the modulation symbols for respective carriers are demodulated into two-bit data at a constellation demapper 59 which inversely performs the constellation conversion that was processed at the transmitter section.

The recent general trend is toward the digital broadcasting not only of the sound but also the TV signal, which has led to some proposals for using the QFDM also in digital TV broadcasting. On the other hand, since the digital TV broadcasting requires a higher transmission capacity than the DAB method, a modulation form is customarily used with higher transmission efficiency. What is problematic in this system is that the modulation with higher transmission efficiency requires in general better transmission conditions, namely better receiving C/N ratio (carrier to noise ratio). In the DAB method, for example, a quadrature phase shift keying (referred to as QPSK) is used as a modulation form to modulate the respective carriers of the QFDM. The digital TV broadcasting has also proposed a 16-quadrature amplitude modulation (referred to as 16 QAM) and a 64-quadrature amplitude modulation (referred to as 64 QAM) in addition to the QPSK. It should be noted that in any multi-valued modulation form the more the multi-valued level number, the required C/N ratio increases, thereby reducing the service area. Moreover, it is one of the characteristics of the digital broadcasting that negligible geographical difference may cause worse receiving conditions. In some cases, reception might be absolutely impossible. To overcome such a situation, a concept called "graceful degradation" has been proposed. This concept consists of a hierarchical demodulation of such information only as can be received in terms of the receiving conditions of the receiver.

The modulation form that can be used in the QFDM transmission is (multi-valued) quadrature modulation and one similar thereto, namely a QPSK (equivalent to 4 QAM), an N-QAM or an N-phase PSK (N: integer 2 or higher). The PSK larger than the 16-phase level is not generally used because its required C/N ratio that is higher than the 16 QAM. In addition, the QAMs other than 2 QAM and 4 QAM (2 QAM and 4 QAM are equivalent to the 2-phase PSK and the QPSK) is restrained in that it is difficult to differentially encode due to the characteristic of its constellation and that it should be demodulated through the coherent detection.

As has so far been discussed, the DAB transmission system performs a modulation presupposing such differential encoding as the QPSK. In consideration of the digital TV broadcasting, however, it falls short of the transmission capacity in its modulation form with lower multi-valued level such as the QPSK that enables the differential encoding. In consequence therefore it is compelled to utilize such higher multi-valued modulation as is difficult to differentially encode.

Even such a hierarchical transmission as the graceful degradation using a modulation form with higher multi-valued levels only, or using simultaneously plural modulation forms with different C/N ratios required in such a multicarrier transmission as the QFDM, accomplishes nothing unless a stable demodulation operation is systematically guaranteed even under poor receiving conditions. Previous devices made no effort to stabilize the receiving operation as a transmission system except by the utilization of the null symbols.

SUMMARY OF THE INVENTION

It is, therefore, an object of the present invention to provide a transmission system (a transmitter and a receiver therefor) that can realize a stable demodulation in the hierarchical QFDM transmission even under poor receiving conditions.

Another object of the present invention is to provide such a transmission system (a transmitter and a receiver therefor) that can stably demodulate the information at least from lower hierarchical layers.

In order to achieve the above object, a hierarchical information transmission system according to one aspect of the present invention includes, means for constructing a frame comprised of a plurality of symbols in an quadrature frequency multiplex signal transmission system that transmits a plurality of hierarchical information data using a modulation form with respectively different C/N ratios as required, means for performing the interleaving, in both the time and frequency domains, between the data using respective modulation forms within the frame, and means for making the respective modulation forms associate with respective predetermined carriers.

Furthermore, the transmission system according to another aspect of the present invention includes means for constituting a frame comprised of a plurality of symbols, means for performing interleaving in both the time and frequency domains among the data using respective modulation forms within the frame, means for differentially encoding at least a part of the modulation forms, and means for making respective modulation forms associate with respective predetermined carriers.

According to another aspect of the present invention a transmitter includes means for forming modulated signals, means for making the plurality of hierarchical information data associate with modulation forms of respective different C/N ratios as required, means for performing the interleaving in both the time and frequency domains among the modulation signals in different modulation forms within a frame comprised of a plurality of symbols, and means carrying out an inverse Fourier transform for every symbol by making respective modulation forms associate with respective predetermined carriers.

Furthermore, a transmitter according to another aspect of the present invention includes means for interleaving both in the time and frequency domains among the symbols in respective modulation forms within a frame comprised of a plurality of symbols, means for differentially encoding at least a part of the modulation forms, and means carrying out an inverse Fourier transform for every symbol by making respective modulation forms associate with respective predetermined carriers.

According to another aspect of the present invention a receiver includes means for carrying out a Fourier transform for every symbol, means for recovering carriers using the Fourier transform output of specific carriers allocated to the lowest hierarchy of a plurality of modulation forms, means for coherently detecting signals of all the modulation forms using the recovered carriers, means for reconstructing a frame comprised of a plurality of symbols, means for carrying out deinterleaving in both the time and frequency domains among the signals in respective modulation forms within the frame, and means for recovering a plurality of hierarchical information data from the modulation forms with respective different C/N ratios as required.

Furthermore, a receiver according to another aspect of the present invention includes means for carrying out a Fourier transform for every symbol, means for recovering carriers using the lowest hierarchy of a plurality of modulation forms allocated to a specific carrier, means for coherently detecting other modulation forms using the recovered carriers, means for demodulating the lowest hierarchy of modulation form by a differential detection, means for reconstructing a frame comprised of a plurality of symbols, means for performing deinterleaving in both the time and frequency domains among the signals in respective modulation forms within the frame, and means for recovering the plurality of hierarchical information data from the modulation forms of respective different C/N ratios as required depending to transmission conditions.

In the quadrature frequency multiplex signal transmission system, by using the foregoing means, the plurality of hierarchical information data using the modulation forms with respective different C/N ratios as required, the frame comprised of a plurality of symbols is constructed wherein the interleaving is performed in both the time and the frequency domains among the data using their respective modulation forms. The respective modulation forms are associated with the respective predetermined carriers. Thus, in the receiver section carriers for use in the coherent detection can be recovered only by the lower hierarchical modulation forms, thereby stabilizing the operation of the receiver even under poor receiving conditions.

Further, the differential encoding of a part of the modulation forms allows for the demodulation of the corresponding (lower hierarchical) information data at the receiver section without employing any coherent detection processing. Therefore the operation can be performed in such a manner that at least a part of the information data is demodulated despite extremely unfavorable receiving conditions that makes it difficult to recover the carrier required for the coherent detection.

According to the transmitter having the abovementioned means, modulation signals are produced using the aforesaid means by making the plurality of hierarchical information data associated with the respective modulation forms with different C/N ratios as required, with interleaving performed in both the time and frequency domains among the signals of respective modulation forms within the frame comprised of a plurality of symbols. Thereafter, the inverse Fourier transform produces an actual transformed wave, and then the respective modulation forms are allocated to the respective predetermined carriers for every symbol.

Further, the operation allows for at least a part of the modulation forms to be differentially encoded.

According to the receiver, after the Fourier transform has been performed on every symbol by the foregoing means, a carrier recovery is attained using the Fourier transform output of the specific carrier allocated to the lowest hierarchy of the modulation form among the plurality of modulation forms. Using this recovered carrier enables the device to coherently detect the signals under any of or all the modulation forms. Deinterleaving is performed in both the time and frequency domains among the signals in respective modulation forms within the frame with the plurality of hierarchical information data recovered from the modulation forms with respective different C/N ratios as required. Furthermore, the operation allows for the lowest hierarchical modulation form to be demodulated by the differential detection.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof may be more readily obtained as the same becomes better understood by reference to the following detailed description when considered in connection with the accompanying drawings, wherein.

DESCRIPTION OF THE PREFERRED EMBODIMENTS

Figure 1:
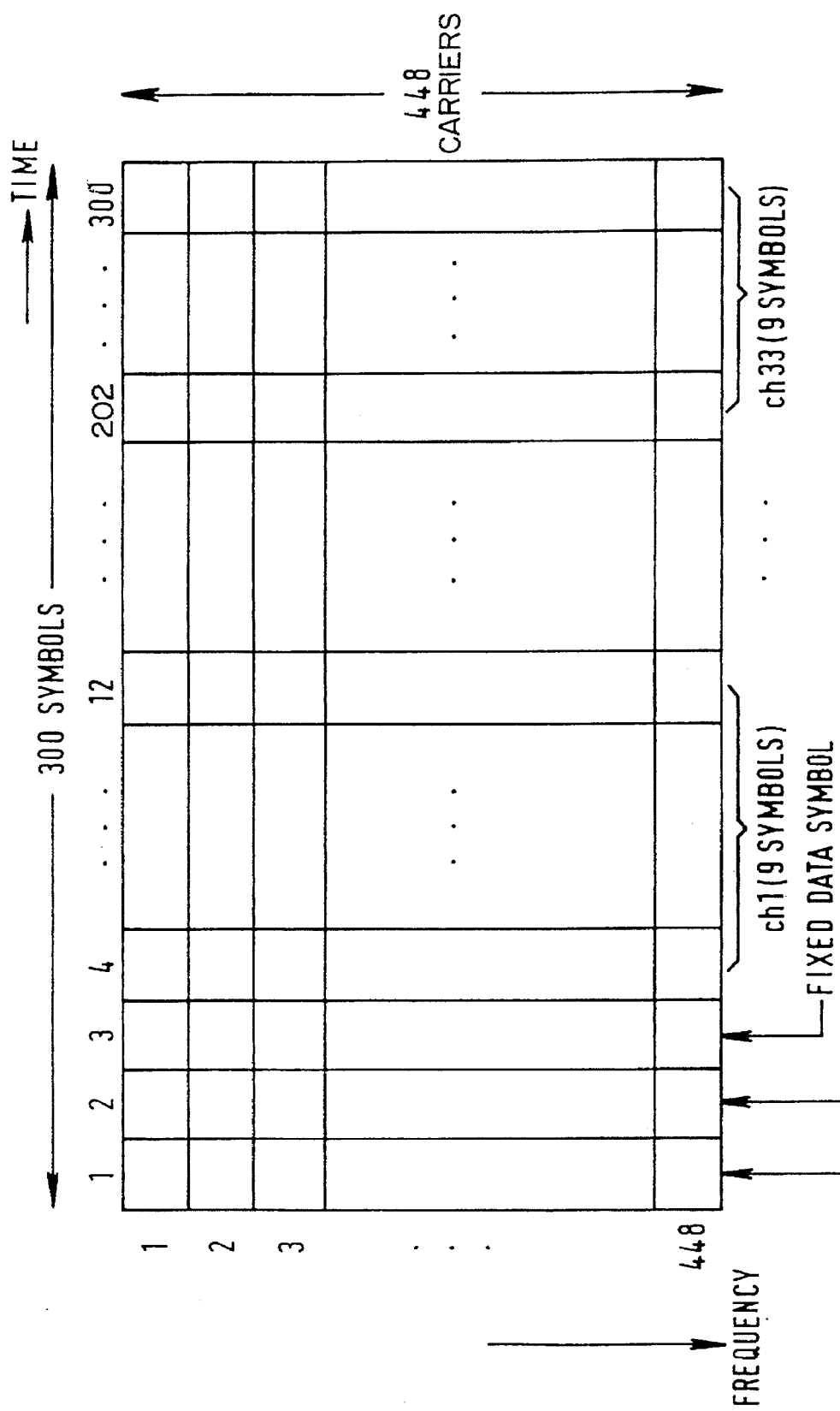
FIG. 1 is a diagram for explaining a conventional hierarchical QFDM transmission frame.
Figure 2:
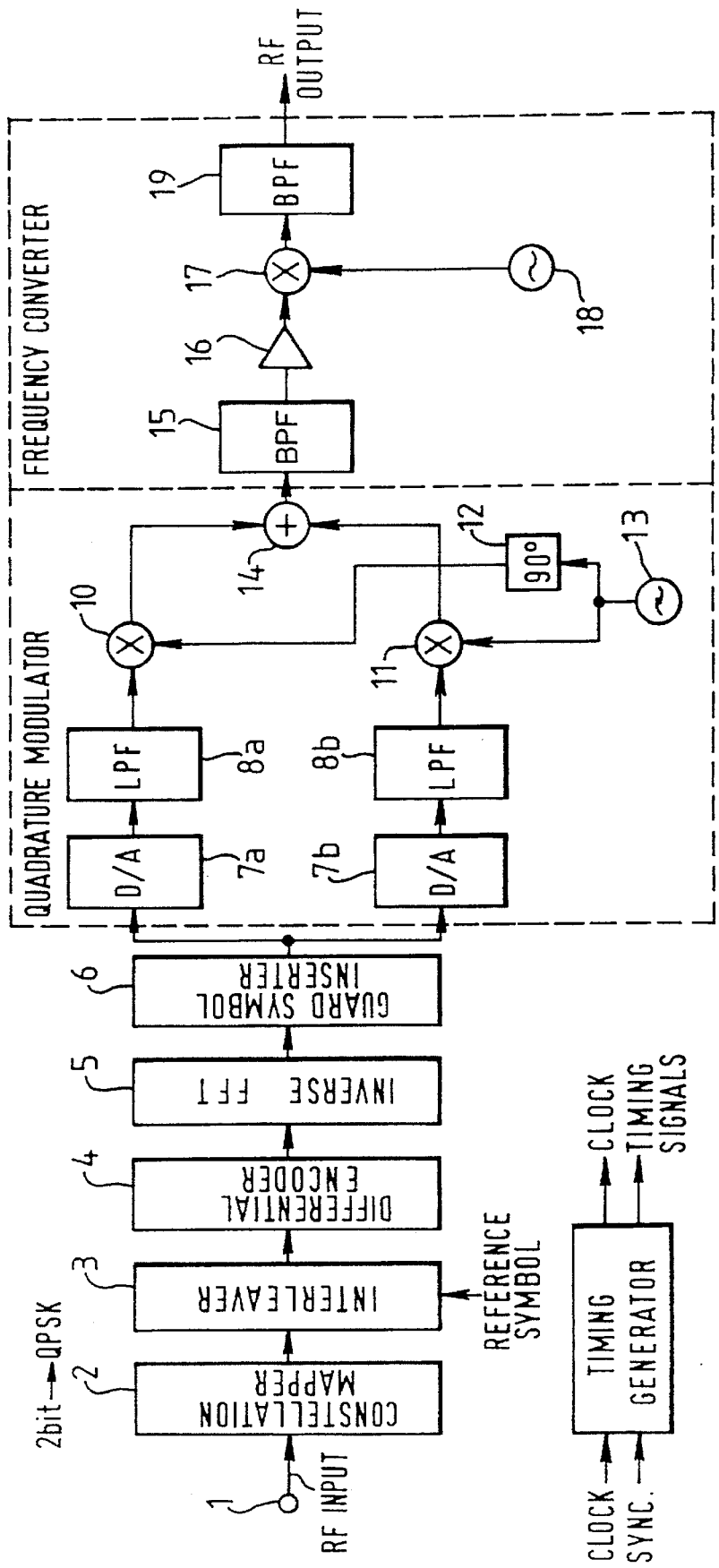
FIG. 2 is a block diagram showing a conventional QFDM transmitter.
Figure 3:
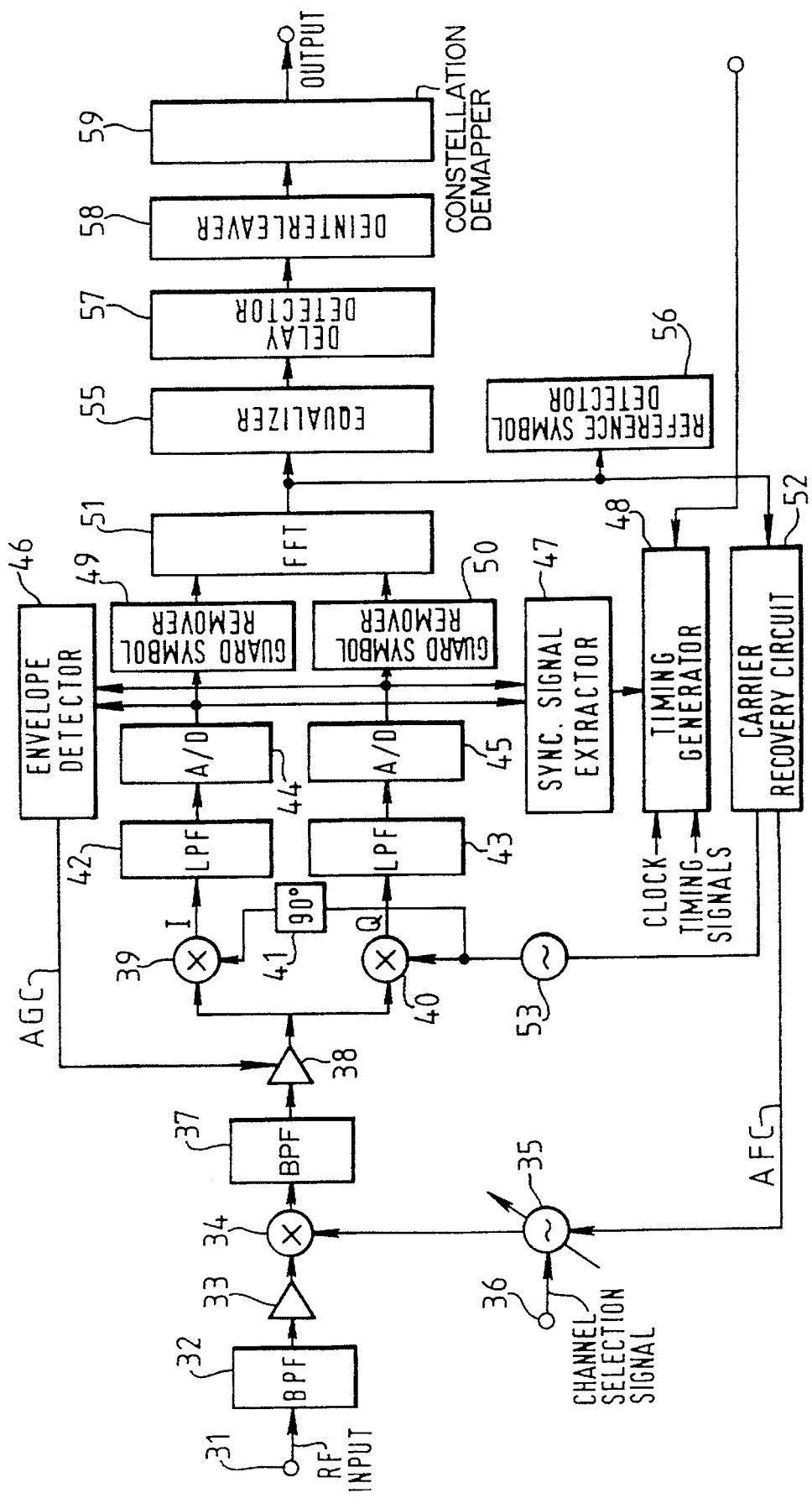
FIG. 3 a block diagram showing a conventional QFDM receiver.

Referring now to the drawings FIGS. 4 through 16a–16d, some embodiments of the present invention will be explained hereinafter.

Figure 4:
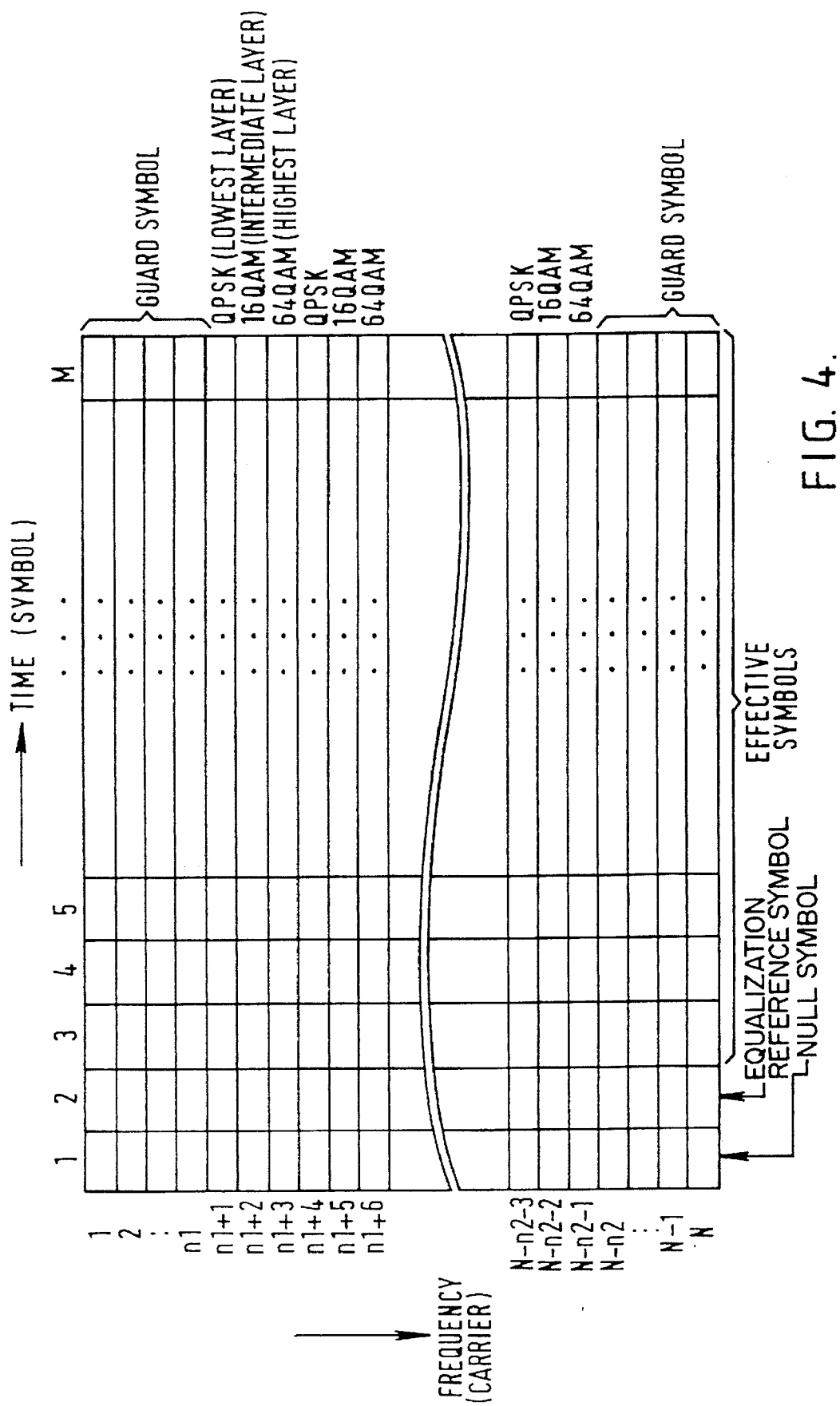
FIG. 4 is a diagram for explaining the hierarchical QFDM transmission frame in an embodiment according to the present invention.

FIG. 4 represents an embodiment of a transmission system according to the present invention, where a transmission frame construction corresponds to that in the conventional one, as shown in FIG. 1.

In a two-dimensional arrangement, as shown in FIG. 4, the row direction represents the frequency axis direction (i.e., QFDM carrier number), while the column direction represents the time axis direction (i.e., QFDM modulation symbol number). What follows describes the differences from the conventional system.

The carriers with the numbers 1 through nl and N-n2 through N, located on both ends of the channel, are used as guard bands, but are not used for effective data. The carrier with the number nl+1 is allocated for the lowest hierarchical information data among the hierarchically constructed information data. This example also illustrates that the intermediate hierarchical information data and the highest hierarchical (uppermost hierarchical) information data have been assigned to a nl+2 carrier and a nl+3 carrier, respectively. Similarly and repeatedly, the carriers and hierarchical information are made to associate with each other in the sequential order of the lowermost hierarchy, the intermediate hierarchy, the uppermost hierarchy and so on.

The embodiment, as shown in FIG. 4, shows a QPSK as the modulation form in the lowermost hierarchy, a 16 QAM as that in the intermediate hierarchy, and lastly a 64 QAM as that of the uppermost hierarchy. In the time axis direction a first symbol is taken as a null symbol for use of synchronization as in the conventional cases, while a second symbol is taken as an equalization reference symbol. A third symbol and subsequent symbols are information symbols or effective symbols.

Establishing associations between the respective carriers and the hierarchical layers with such a frame construction allows a receiver section to know beforehand which carrier has been modulated in which modulation form, which not merely facilitates the extraction of information of respective hierarchical layers but gives the following effects.

A multi-valued modulation form, if used, when conducting a demodulation on the receiver section presupposes a coherent detection. Here, it is known that the higher the multi-valued level is raised, the more complicated a carrier recovery for coherent detection becomes, and also the more difficult it becomes to process, especially under unfavorable receiving conditions (for example, a low C/N ratio condition, a heavy fading condition, etc.). The transmission frame construction and establishment of the relationships between the respective carriers and the layers in the hierarchical construction according to the present invention, however, make it possible to recover carriers by selecting a modulation form with a lower multi-valued level that is already known in the receiver. As a consequence, the coherent detection can be performed with ease even under poor receiving conditions.

Although the embodiment of the hierarchical arrangement, as shown in FIG. 4, illustrates the allocation sequence to each carrier such as the lowermost, the intermediate and the uppermost hierarchical layers and so on, the present invention is not limited to this embodiment.

The embodiment of the hierarchical arrangement, as shown in FIG. 4, employs a QPSK, a 16 QAM and a 64 QAM as the modulation forms in the lowest, the intermediate and the highest hierarchical layers, respectively. This embodiment gives a case where required C/N ratios in respective modulation forms are stepped by about 7 dB. Too little difference between the required C/N in these modulation forms tends to nullify the merits of the hierarchical transmission, while too large a difference makes it virtually impossible to demodulate higher hierarchical layers of information at numerous receiving locations. The difference of 7 dB between required C/N ratios, if simply converted into transmission distance equals about 2.2 times, which is a suitable value to make use of the characteristics of the hierarchical transmission. At the same time these modulation forms, if combined, give about 24 Mbps as an overall transmission bit rate in a 6 MHz channel. Even in consideration of the guard band and like factors, 20 Mbps can ensure that the required transmission capacity (approximately 18 Mbps) of proposed U.S. ATV systems are obtained. The value of the bit rate is therefore of the appropriate level from this viewpoint. It should be noted, however, that this combination does not limit the scope of the present invention.

A more concrete example of the interleaving in the present transmission system will now be described. Basically, a specific modulation form has been allotted to each carrier, where interleaving is performed in both the time and frequency domains between respective modulation forms (i.e., the respective hierarchical information data). The interleaving heightens the endurance against variations in a frequency selective fading and a temporal transmission characteristic.

Figure 5:
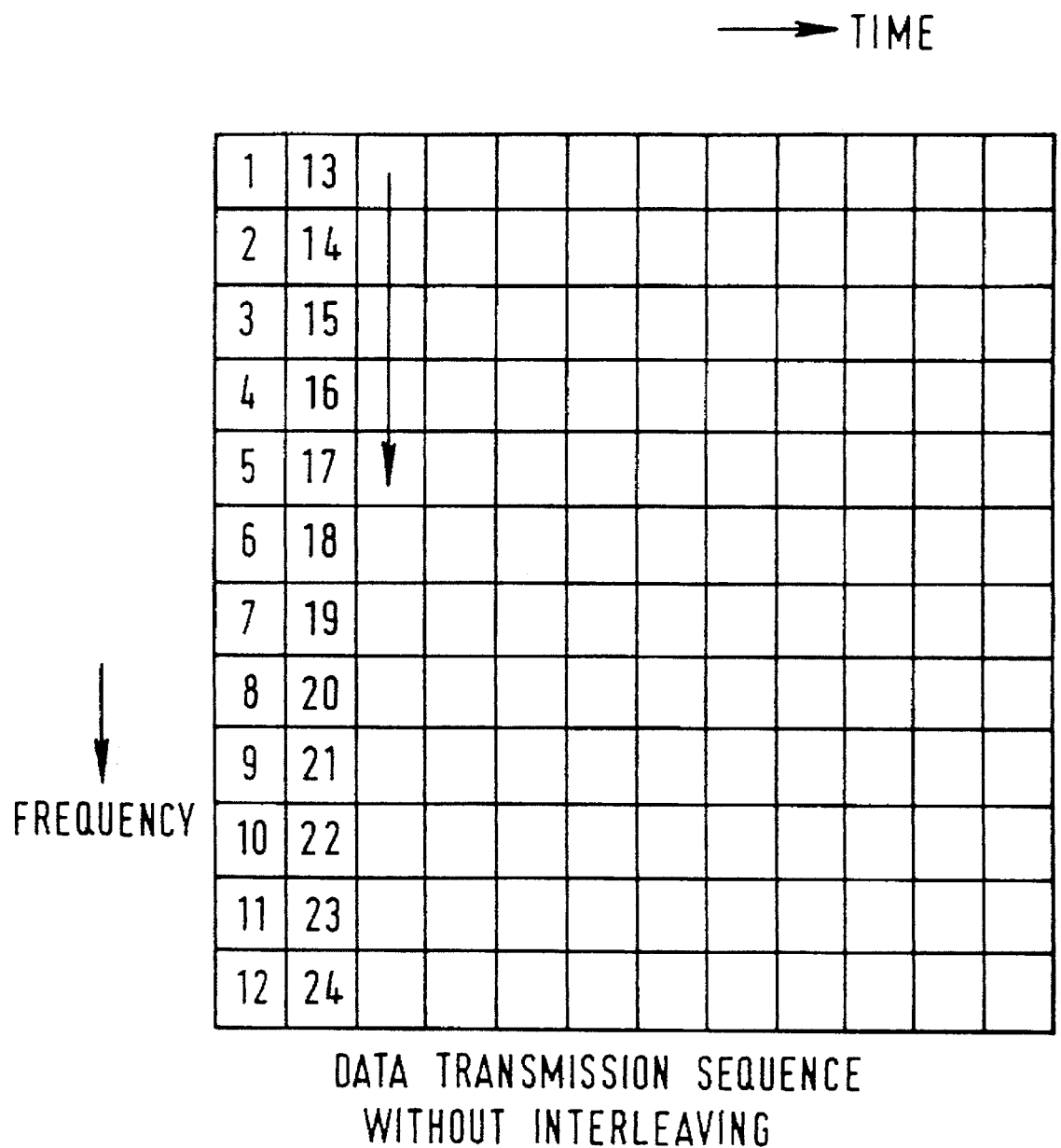
FIG. 5 is an exemplary hierarchical construction prior to an interleaving, according to the present invention.

FIG. 5 shows an exemplary hierarchical construction not yet processed by any interleaving. When any number of hierarchical layers are transmitted, corresponding number of interleaving is performed on the number of transmitting hierarchical layers. In FIG. 5, information data is written into memories along the frequency direction (row direction) in a sequential order. Thus, one column of data is converted into an QFDM modulation symbol. If in this case the data suffers an interference on a transmission channel, a bulk of series data are damaged, which may reduce the error correction capability of the receiver section.

Figure 6:
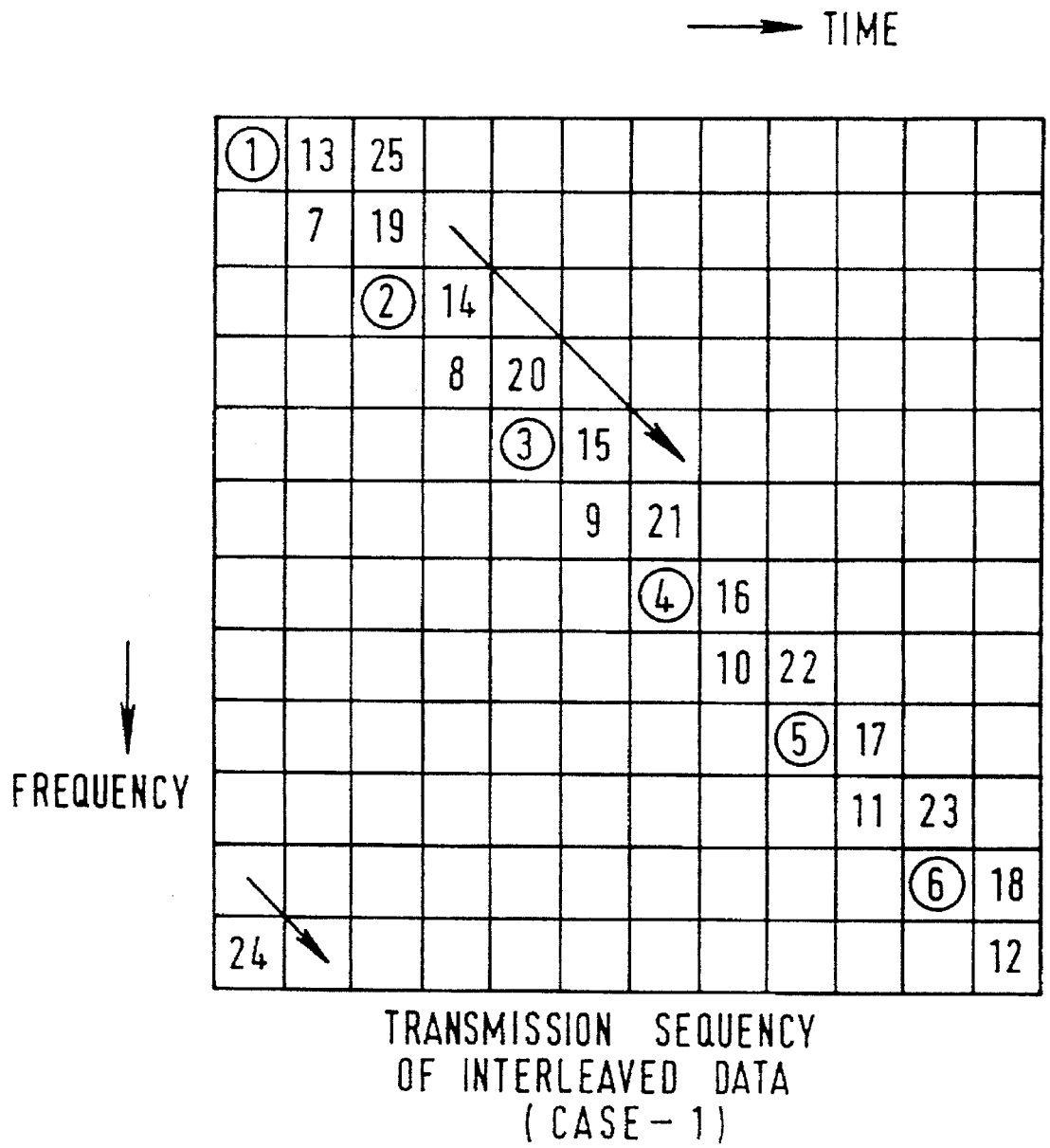
FIG. 6 is an exemplary hierarchical construction after an interleaving, according to the present invention.

FIG. 6 depicts an example where interleaving has been executed on the symbols in the hierarchical construction. In this case, two consecutive data are isolated by a proper distance so as not to be adjacent with each other in the two-dimensional arrangement. Even if interference such as that described above arises, the transmission error becomes similar to a random error rather than to a burst error, thereby preventing degradation of the error correction capability.

Figure 7:
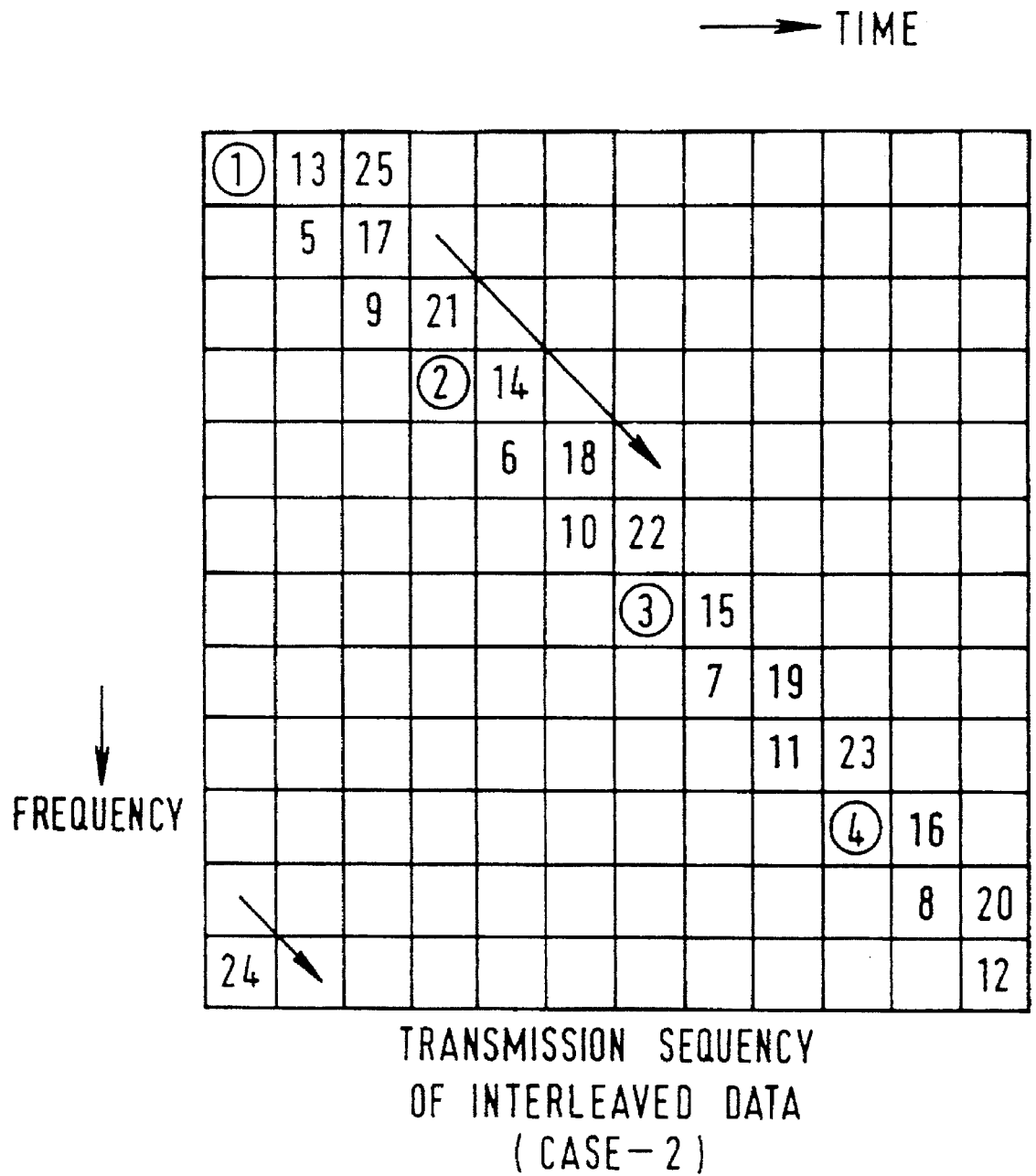
FIG. 7 is another exemplary hierarchical construction after an interleaving, according to the present invention.

FIG. 7 gives another example for further optimization of the data restoration. In this case, two consecutive data are isolated by a much larger distance in the two-dimensional arrangement. This is accomplished by interleaving the data by every three units rather than every two units. The degree of the optimization may be defined in response to the size of the two-dimensional construction.

These interleaving processes are repeatedly conducted only on the same modulation forms, as shown in FIG. 4. This fact, which characterizes the present invention, is a factor required to ensure data restoration.

Another embodiment of the transmission system according to the present invention will now be explained. Hereinafter, the principle and the effects of this transmission system will be discussed.

This embodiment is characterized in that the modulation form in lower hierarchical layers makes use of the differential encoding method. Although conventional systems require differential encoding in the modulation forms for all the carriers, the present invention allows for differential encoding in only such lower hierarchical layers of modulation forms (for example, two-phase PSK, QPSK, 8-phase PSK, etc.) as can be differentially encoded in due consideration of the fact that the higher hierarchical layers of multi-valued modulation forms cannot be differentially encoded. That implies that specific carriers are modulated in the modulation form that includes differential encoding. This operation enables the signals in lower hierarchical layers to be demodulated by the differential detection at the receiver section. Because differential detection does not need any carrier recovering operation, it is less apprehended that the reception will become impossible due to poor transmission conditions. Consequently, a guaranteed minimum reception is provided even under any unfavorable receiving conditions. The coherent detection made possible by the signals in higher hierarchical layers contributes to ensure a higher transmission capacity in the multi-valued modulation form, and thus allowing for reception of higher quality of information.

Figure 8:
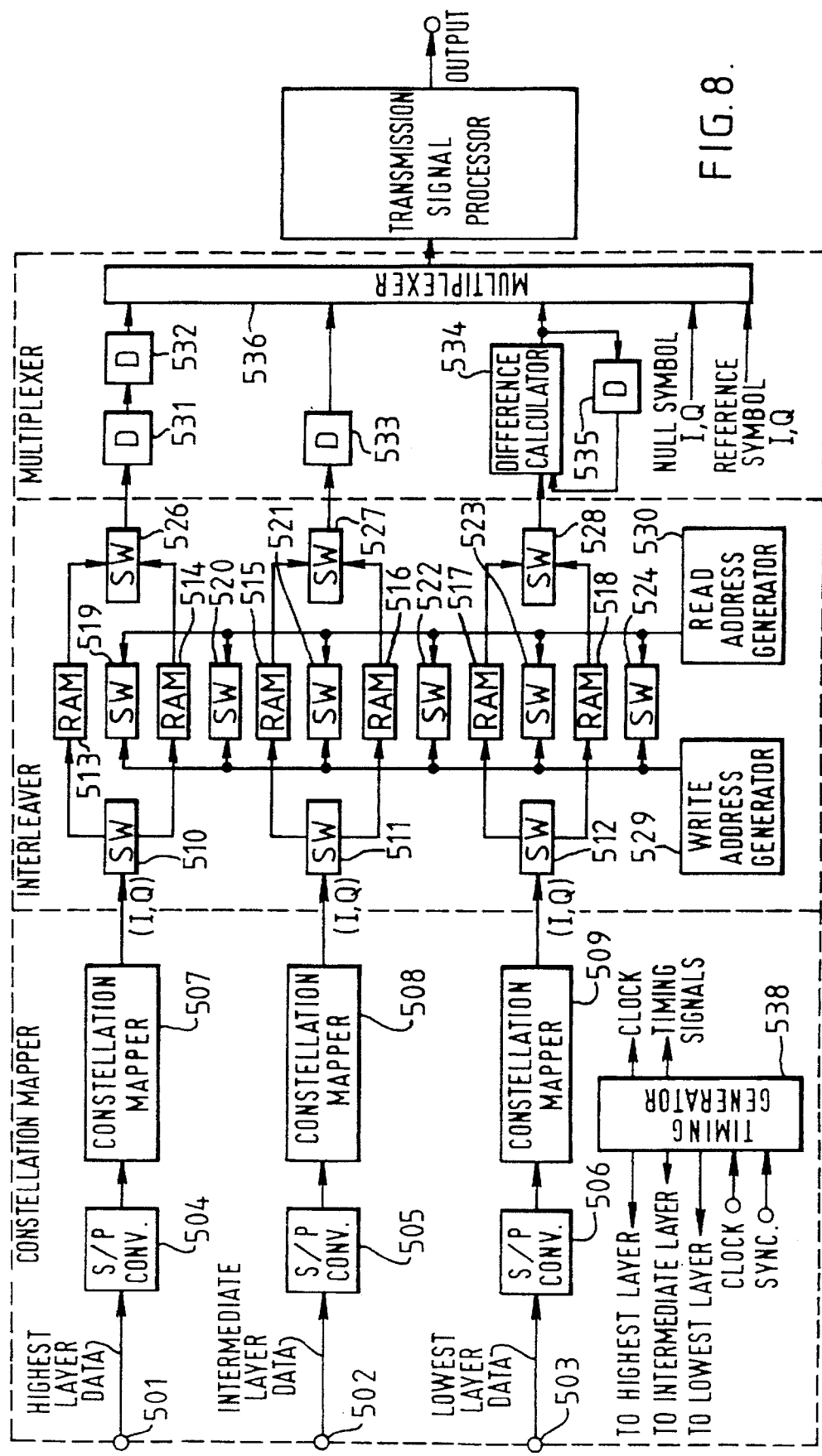
FIG. 8 is a block diagram showing an embodiment of the QFDM transmitter according to the present invention.

FIG. 8 illustrates a transmitter section of the embodiment according to the present invention.

The transmission system for the transmitter is based on the above-described system according to the present invention.

In FIG. 8, three hierarchical information data are assigned for three input terminals 501, 502 and 503. These three hierarchical information data are selectively coupled to their corresponding input terminals according to clocks for each hierarchical layer as output from a timing generator 538. This is because the three hierarchical information data have different transfer rates due to the different transmission capacities among the three hierarchical layers.

The input information of respective hierarchical layers are each converted into a parallel data configuration in serial-parallel (S/P) converters 504, 505, and 506. For example, the layer employing the QPSK modulation is converted into a 2-bit parallel data, while the layers employing the 16 QAM and 64 QAM modulations are converted into a 4-bit and a 6-bit parallel data, respectively.

The above description may be understood by referring to constellations of respective modulation forms, like those as shown in FIGS. 15 and 16a–d. Further if an 8-phase PSK and a 32 QAM are to be employed, there are needed techniques of 3-bit and 5-bit parallel conversions.

The parallel data in respective hierarchical layers are transformed into symbols in the constellation of the respective modulation forms by constellation mappers 507, 508, and 509. This transformation is made by using read only memories (ROMs), etc. The outputs of the constellation mappers 507, 508, and 509 are complex signals consisting of an in-phase axis component (I signal) and an quadrature axis component (Q signal). The timing generator 538 generates timing signals and clocks for use in the respective circuits as well as clocks for use in the respective layers, from clock signals and sync. signals.

The respective complex signals in the respective hierarchical layers are then applied into switches 510, 511, and 512 of the interleaver section.

The switch 510 supplies its input to random access memories (RAMs) 513 and 514. The switch 511 supplies its input to RAMs 515 and 516, while the switch 512 supplies its input to RAMs 517 and 518. The outputs from the RAMs 513 and 514 are supplied to a switch 526, while the outputs from the RAMs 515 and 516 are supplied to a switch 527, and also the outputs from the RAMs 517 and 518 are supplied to a switch 528. The addresses of the respective memories are controlled by the addresses generated by a write address generator 529 and a read address generator 530. Two RAMs are provided in each of the respective hierarchical layers in order that the write-in operation and the read-out operation may be alternately carried out, but consecutively between them.

Then the complex signals that are interleaved in these hierarchical layers are time-adjusted in delay units (Ds) 531, 532, and 533 in the multiplexer section, and then multiplexed sequentially at a multiplexer 536 together with the null symbols and the equalization reference symbols for synchronization. A differential detector 534 and a delay unit 535 are used for conducting the differential encoding which is shown here as an exemplary differential encoding limited to the lowermost hierarchical layer. As described above, the present invention includes systems that do not contain the differential encoding process. When transmitted with differential encoding, the signals in the lower hierarchical layer can be demodulated by the differential detection at the receiver section. As this transmission does not need any carrier recovering operation, the probability of failing to receive this transmitted signal is very low, even under unfavorable receiving conditions, and this makes it possible to have guaranteed minimum reception even under poor receiving conditions.

Figure 10:
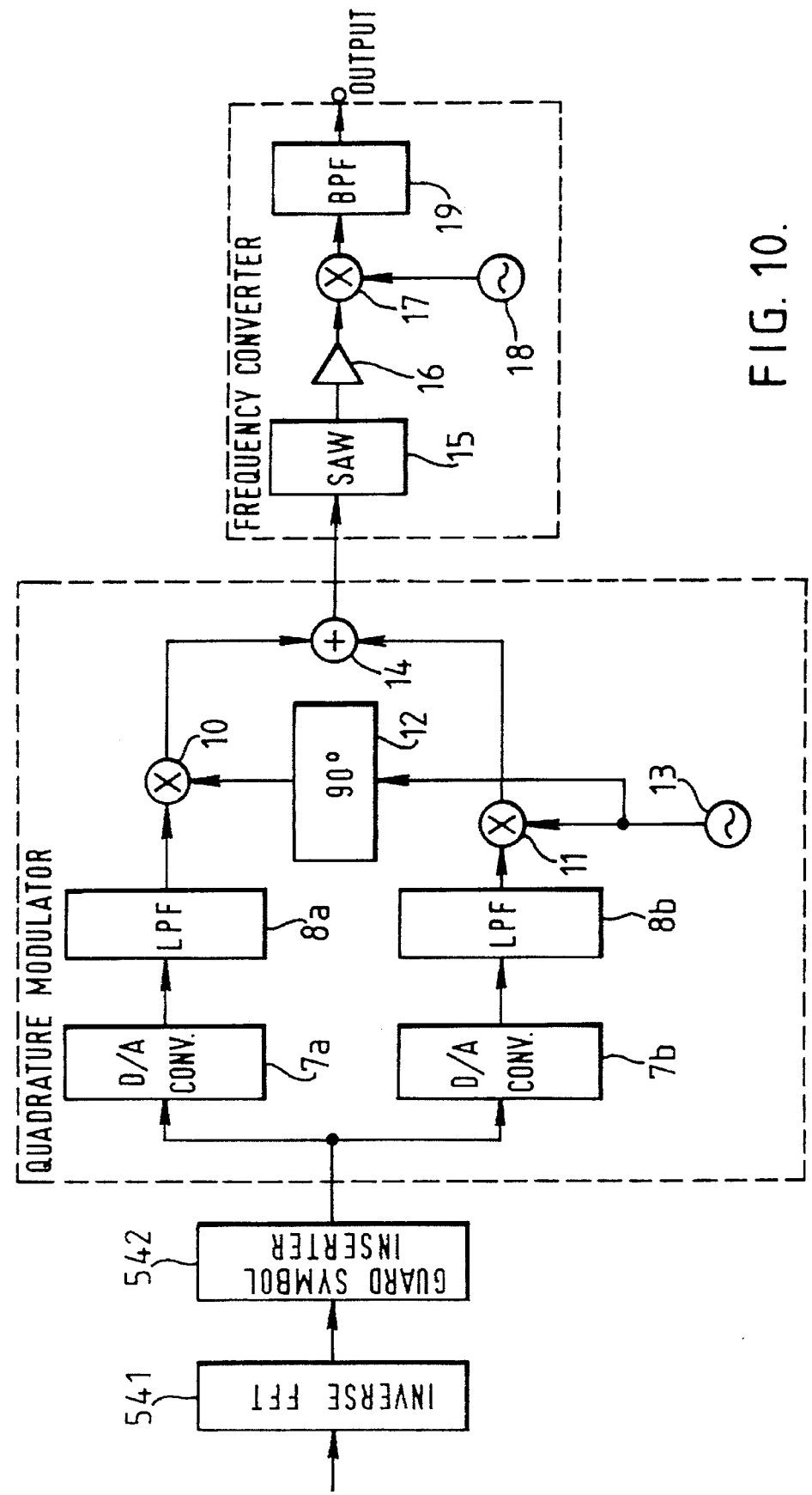
FIG. 10 is a block diagram for illustrating the details of the transmission signal processors of FIGS. 8 and 9.

The multiplexed output is fed to the transmission signal processor. FIG. 10 illustrates the detail of this transmission signal processor. The multiplexed output is converted by an inverse FFT circuit 541 so as to be output as a time domain waveform. Then it is input to a guard period symbol by a guard symbol inserter 542 so as to be output as an RF signal at a downstream quadrature modulator and a frequency converter. Since this process is the same as that in the conventional system, its detailed explanation will be omitted.

Thus, the interleaving is realized in the respective modulation forms corresponding to the respective hierarchical layers. The processing is so designed that the signals output from the interleaver are sequentially multiplexed with specific carriers modulated in specific modulation form at the inverse FFT output.

Figure 9:
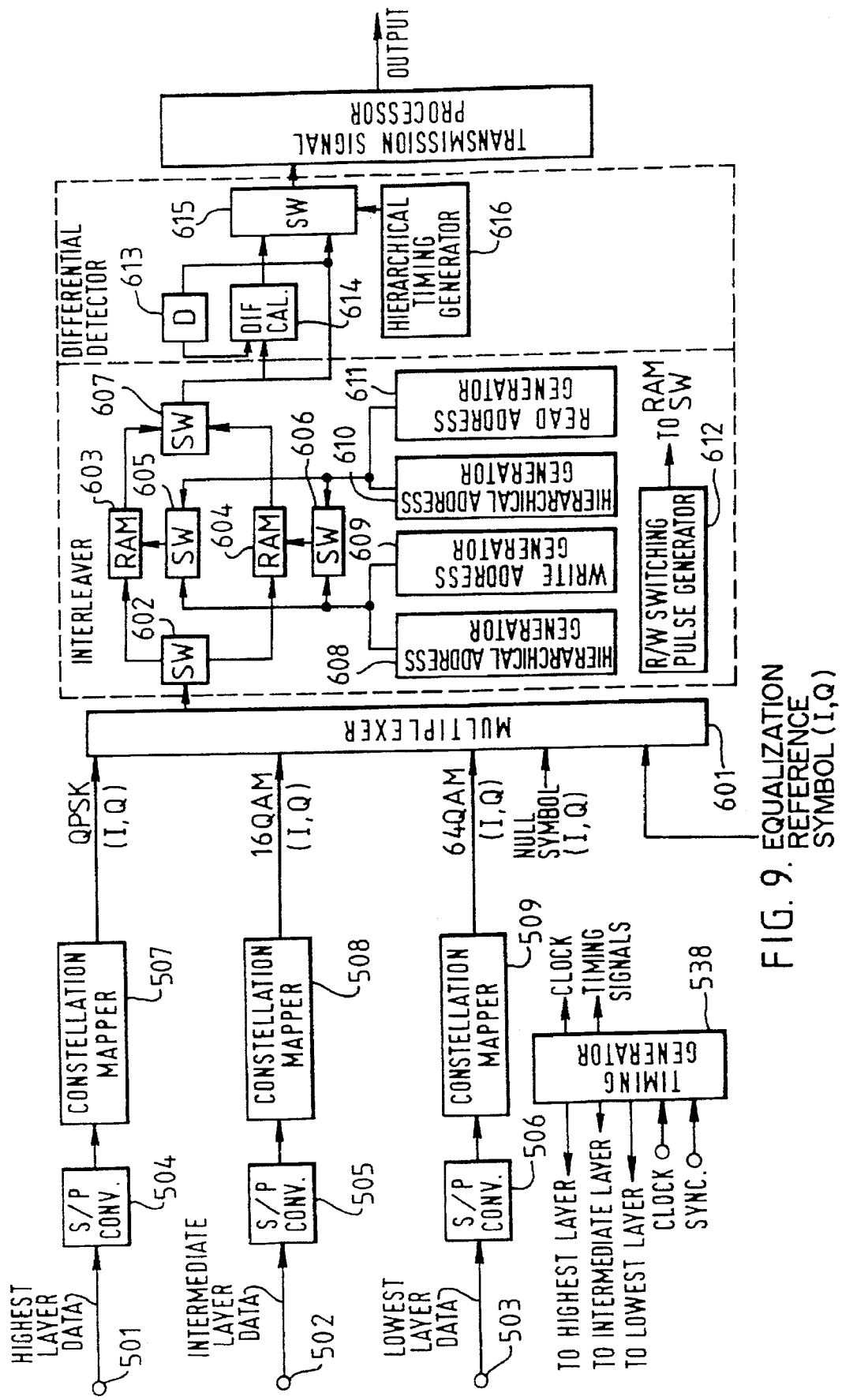
FIG. 9 represents a block diagram showing another embodiment of the QFDM transmitter according to the present invention.

FIG. 9 shows another embodiment of transmitter according to the present invention.

In FIG. 9, the transmission system used in the embodiment is the same as that of the embodiment described above. Like reference numerals denote like elements or portions in the drawings of the above embodiments. Similarly three hierarchical information data are input to the transmitter of FIG. 9. The serial-parallel processing and constellation mapping are also the same as those in the above embodiment.

Then the respective hierarchical layers are multiplexed at a multiplexer 601 together with the null symbol for synchronization and the equalization reference symbol. An output from a switch 602 is input into RAMs 603 and 604. The outputs from the RAMs 603 and 604 are applied to a switch 607. The addresses of the RAMs 603 and 604 are given through switches 605 and 606, respectively. In this interleaver the interleaving is performed in conformity with the rule limited to within the respective hierarchical layers as described above. In the respective RAMs, the address spaces for each hierarchical layer are divided, then these divided regions are assigned by upper addresses. Hence the addresses assigning the hierarchical layers are specified in hierarchical address generators 608 and 610 respectively during their write-in operation and the read-out operation. The lower addresses are common to the two processing systems that control them (i.e., address generators 609 and 611). Furthermore, a read/write (R/W) switching pulse generator 612 is also provided in the interleaver, for supplying read/write (R/W) switching pulses to the RAMs and the switches.

Similar to the former embodiment, the output of this interleaver is so instructed that the differential encoding performed by the difference calculation is applied to the lower hierarchical layers and that whether this encoding should be performed for each layer is controlled at a switch 615 and a hierarchical timing generator 616. That is, the output of the switch 607 is not only directly supplied to the switch 615, but also indirectly supplied thereto through the differential encoding by a delay unit 613 and a differential calculator 614. The switch 615 selects any one of the output to supply it to the transmission signal processor. The subsequent steps, which are exactly the same with the former embodiment, are omitted from this description.

Figure 11:
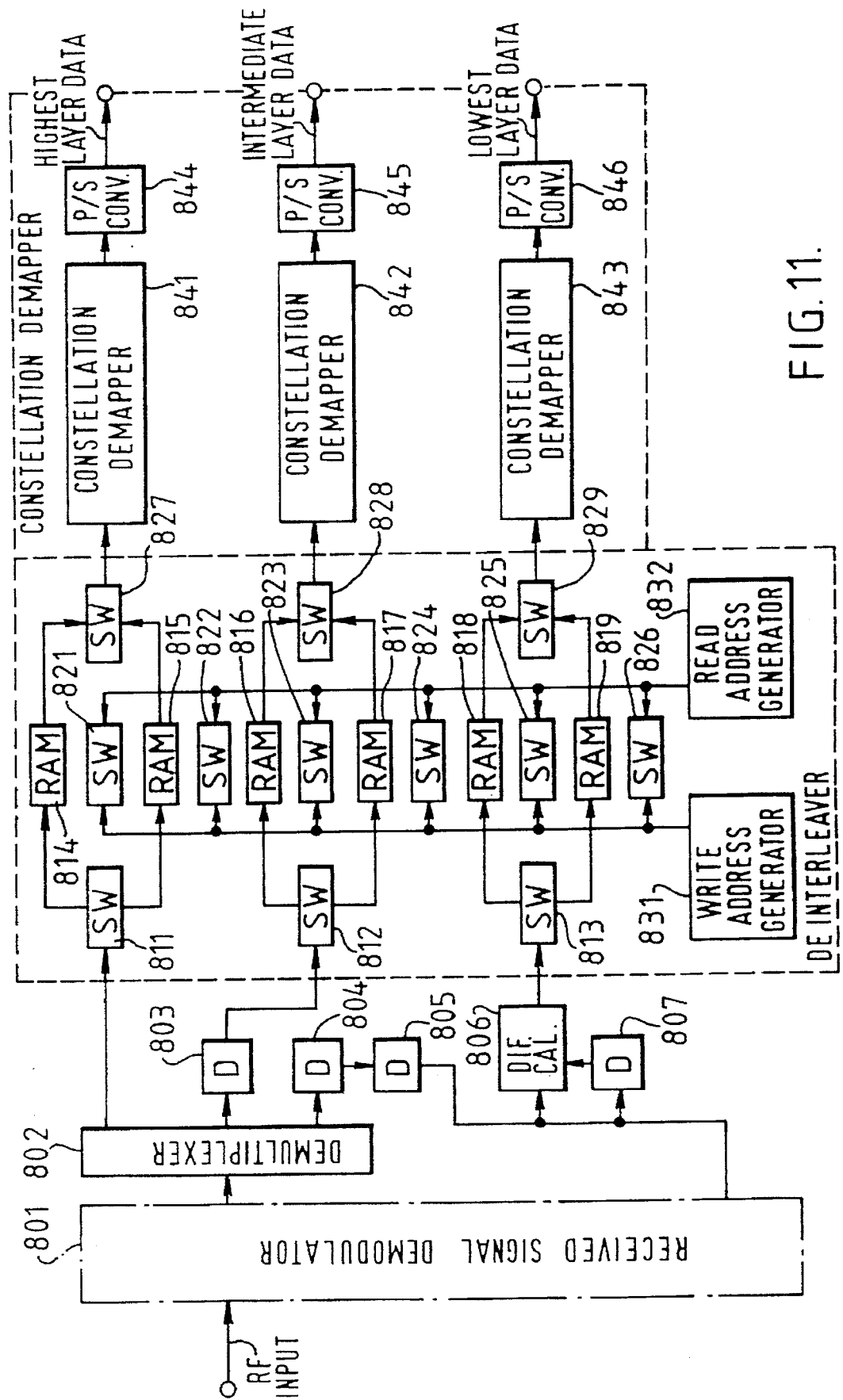
FIG. 11 is a block diagram showing an embodiment of the QFDM receiver according to the present invention.

FIG. 11 shows an embodiment of the receiver according to the present invention.

Figure 12:
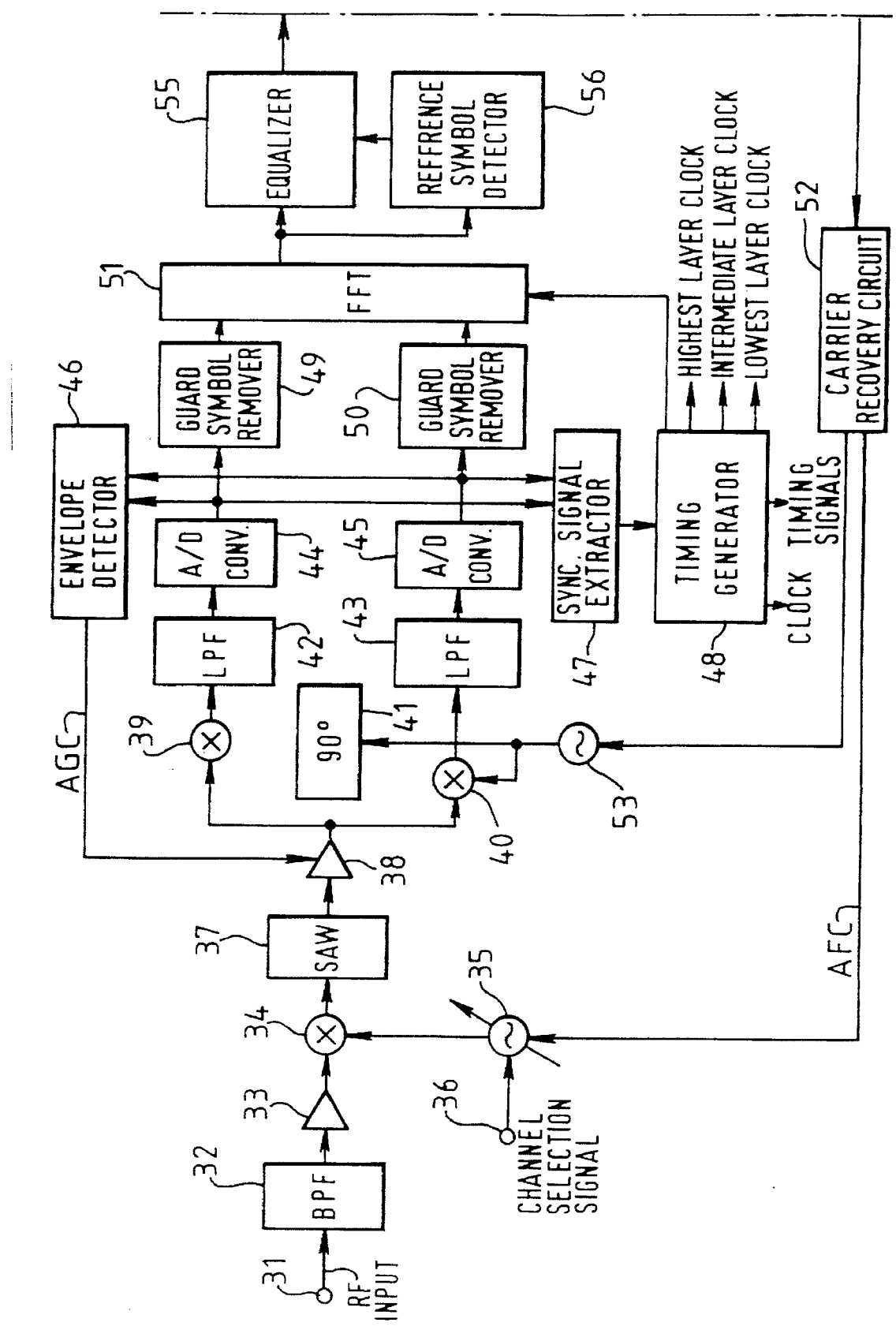
FIG. 12 is a block diagram for illustrating the details of the receiving demodulation section of FIG. 11.

In FIG. 11 the receiver is configured in conformity with the transmission system as discussed above according to the present invention. In this description any explanation of portions that are the same as those in the above embodiments will be omitted. As is clear from a comparison of FIG. 12 with FIG. 11, in a received signal demodulator 801, the input RF signal is converted into a signal in the frequency domain by an FFT circuit 51 after being processed by the channel selection, the quadrature detection, and the analog-digital conversion. Phases and amplitudes of the respective QFDM carriers (or I signal and Q signal) can thus be obtained. The complex signal output from the FFT circuit 51 are executed with an equalizing process and then separated for each hierarchical layer by a demultiplexer 802. The respective layers, which have been transferred beforehand with a carrier arrangement known in the receiver, can be easily separated. In the circuit, as shown in FIG. 12, the timing generator 48 provides the clock for the uppermost hierarchical layer, the intermediate layer, and the lowermost layer.

Next, the complex signal as obtained from the demultiplexer 802 is time-adjusted at delay units 803 through 805 to be output in the original order of data from the deinterleaver by being processed in the entirely opposite manner as the interleaving operation. The output of the uppermost hierarchical layer, which is obtained from the demultiplexer 802, is input into a switch 811, while the output of the intermediate layer is input in a switch 812 through the delay unit 803. The output of the lowermost hierarchical layer is differentially operated at a differential calculator 806 and a delay unit 807, the output of which is input into a switch 813. The construction of the deinterleaver, being exactly the same with that in the transmitter section, is comprised of the switches 811 through 813, 821 through 829, RAMs 814 through 819, a write address generator 831 and a read address generator 832.

The outputs of the switches 827, 828, and 829 are supplied to constellation demappers 841, 842, and 843, respectively. That is, the deinterleaved complex signals having I and Q components in respective hierarchical layers are converted into parallel data depending on the number of bits in the respective layers by the demappers 841 through 843. For instance, the QPSK signal is converted into the 2-bit parallel signal, while the 16 QAM signal and the 64 QAM signal are converted into the 4-bit and the 6-bit parallel signals, respectively. These parallel signals are then converted to their corresponding serial data at parallel-serial (P/S) converters 844 through 846. The clock suited to each hierarchical layer is provided from the timing generator 48 (see FIG. 12).

The differential detector comprised of the differential calculator 806 and the delay unit 807 is illustrated as used only in the lowest hierarchical layer. The present invention is, however, not limited to the case, but covers another configuration in which the differential detection is bypassed or not included. Further, it is easy to selectively employ those configurations appropriately in response to the receiving conditions in this embodiment. The judgement of the receiving conditions is readily realized by observing, for instance, the dispersion of symbols in the constellation in the respective hierarchical layers.

Next, the carrier recovery is achieved by inputting only the modulation form of the lowest hierarchical layer into a carrier recovery circuit 52, as shown in FIG. 12. This enables the system to perform the carrier recovery in the modulation form with the lowest multi-valued level which makes the recovery easier.

Figure 13:
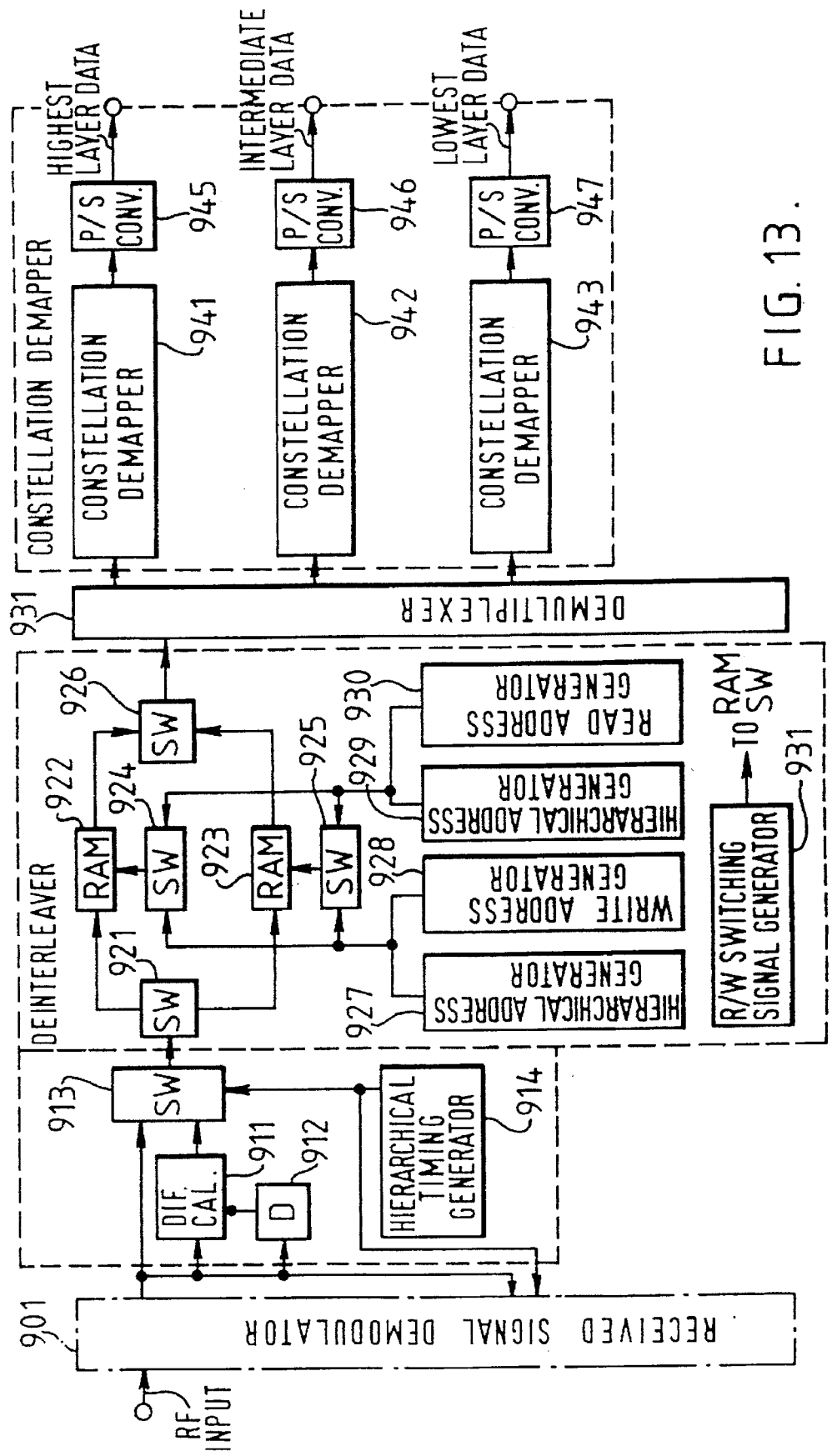
FIG. 13 is a block diagram showing another embodiment of the QFDM receiver according to the present invention.

FIG. 13 represents another embodiment of the receiver according to the present invention.

In FIG. 13, the receiver is configured in conformity with the transmission system as discussed above according to the present invention. In this description any explanation of portions that are the same as those in the above embodiments will be omitted. As is clear from a comparison of FIG. 14 with FIG. 13, in a received signal demodulator 901 the input RF signal is converted into a signal in the frequency domain by the FFT circuit 51 after being processed by the channel selection, the quadrature detection, and the analog-digital conversion. Phases and amplitudes of the respective QFDM carriers (or I signal and Q signal) can thus be obtained. The complex signal output from the FFT circuit 51 are executed with an equalizing process and then supplied into a differential calculator 911, a delay unit 912 and a switch 913. The differential calculator 911, the delay unit 912 and the switch 913 execute the differential detection. The resulted output of the differential detection is then supplied into the switch 913. The switch 913 is controlled by a hierarchical timing generator 914 so that the differential detection output can be selectively derived when the signal in the lowest hierarchical layer is processed. The output from the switch 913 is then supplied into a switch 921 in the deinterleaver. The deinterleaver, comprised of the switch 921 and switches 924 through 926, RAMs 922 and 923, hierarchical address generators 927 and 929, a write address generator 928, a read address generator 930, and a read/write switching pulse (R/W) generator 931, executes a deinterleaving operation which is opposite to the interleaving operation that was executed in the transmitter section.

The above embodiment of the receiver differs from the former embodiment of the receiver in that a demultiplexer 931 is located after the deinterleaver. As operations in this embodiment are carried out in an entirely opposite way to that in the second embodiment of the transmitter section, its detailed explanations will be omitted from this description. The signals in the respective hierarchical layers as obtained from the demultiplexer 931 are supplied to constellation demappers 941, 942 and 943 in the constellation demapper section. That is, the deinterleaved complex signals having I and Q components in respective hierarchical layers are converted into parallel data depending on the number of bits in the respective layers by the demappers 941 through 943. For instance, the QPSK signal is converted into the 2-bit parallel signal, while the 16 QAM signal and the 64 QAM signal are converted into the 4-bit and the 6-bit parallel signals, respectively. These parallel signals are then converted to their corresponding serial data at the parallel-serial (P/S) converters 845 through 847. The clock suited to each hierarchical layer is provided from the timing generator 48 (see FIG. 14).

Figure 14:
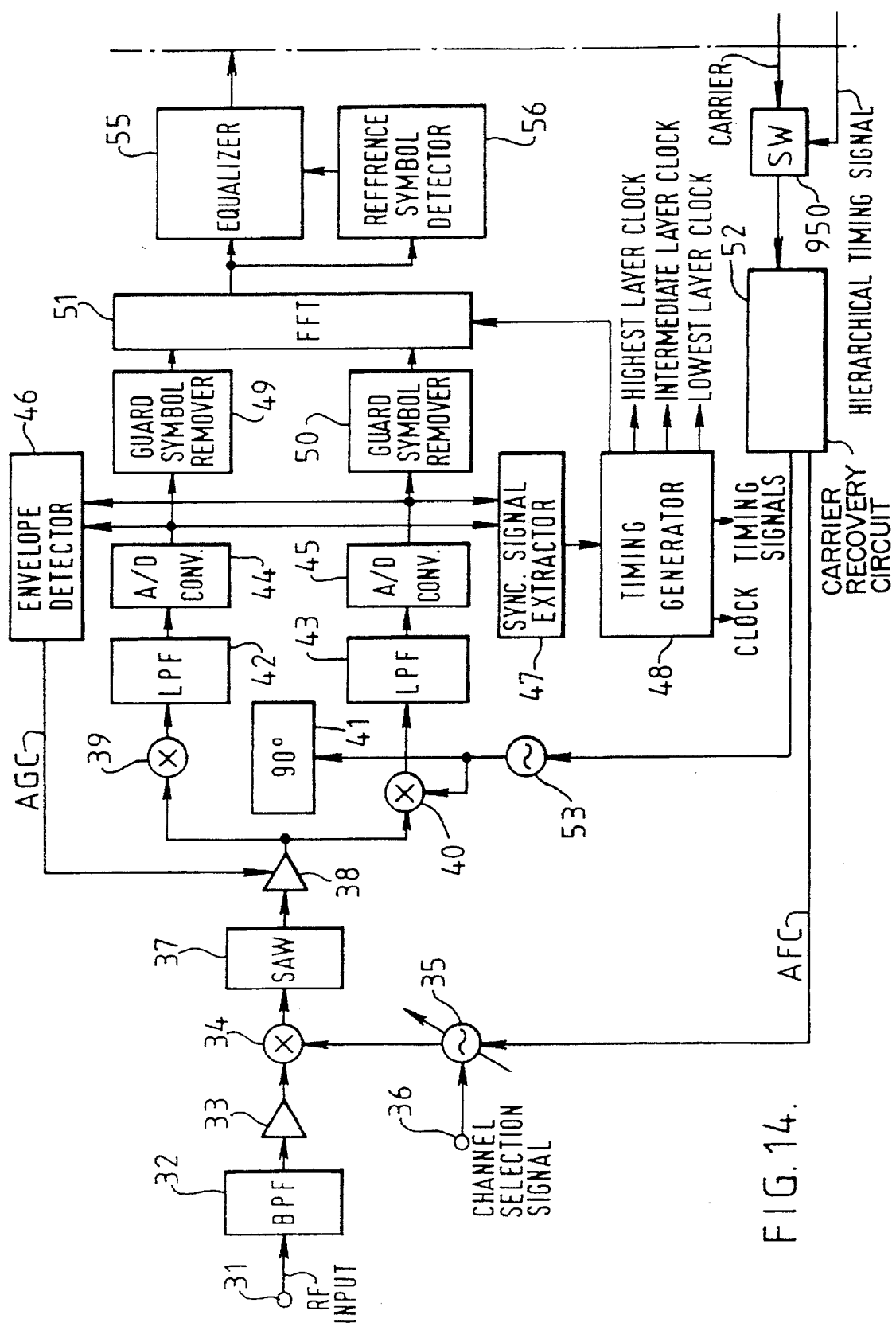
FIG. 14 is a block diagram for illustrating the details of the receiving demodulation section of FIG. 13.
Figure 15:
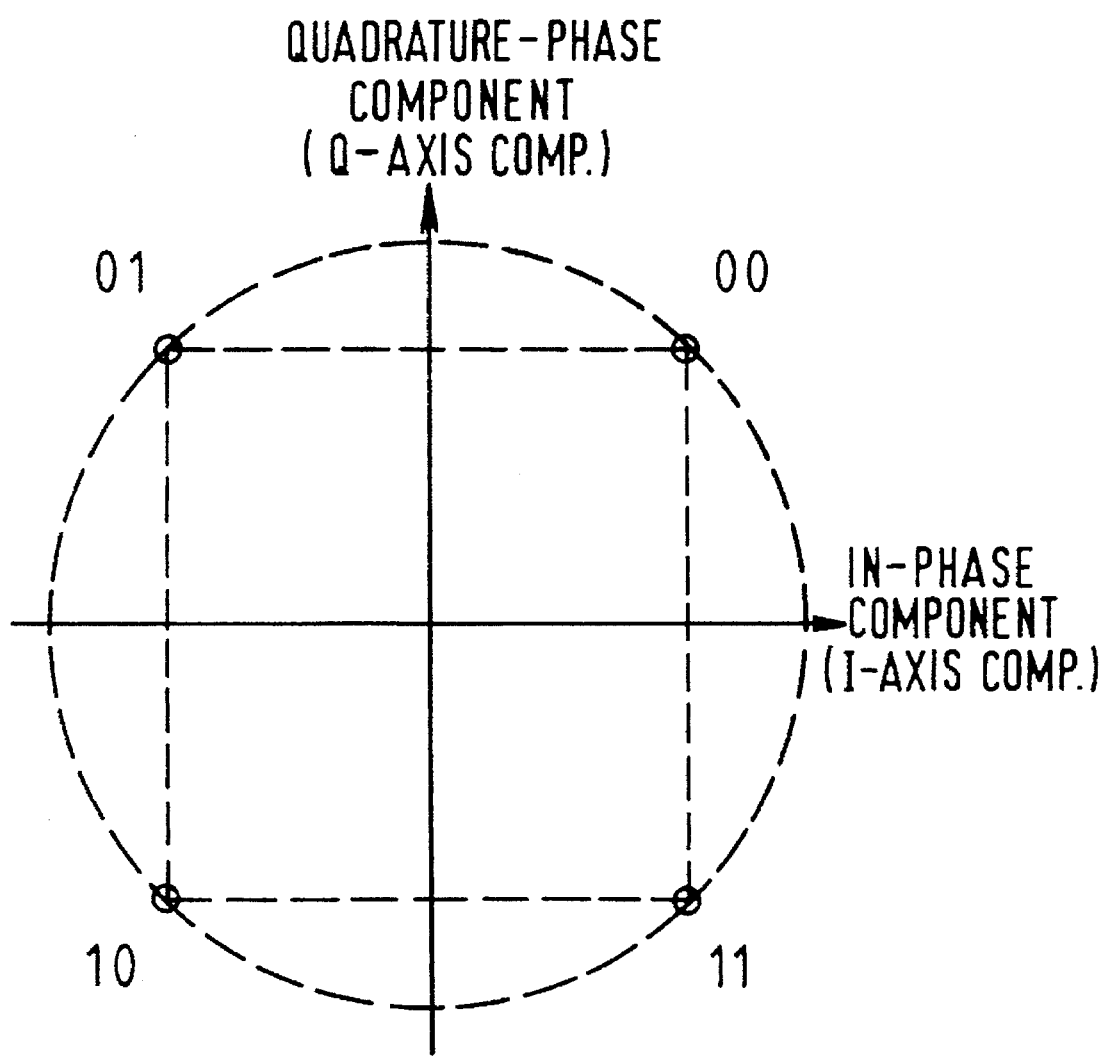
FIG. 15 is an explanatory drawing illustrating the QPSK constellation.
Figure 16A:
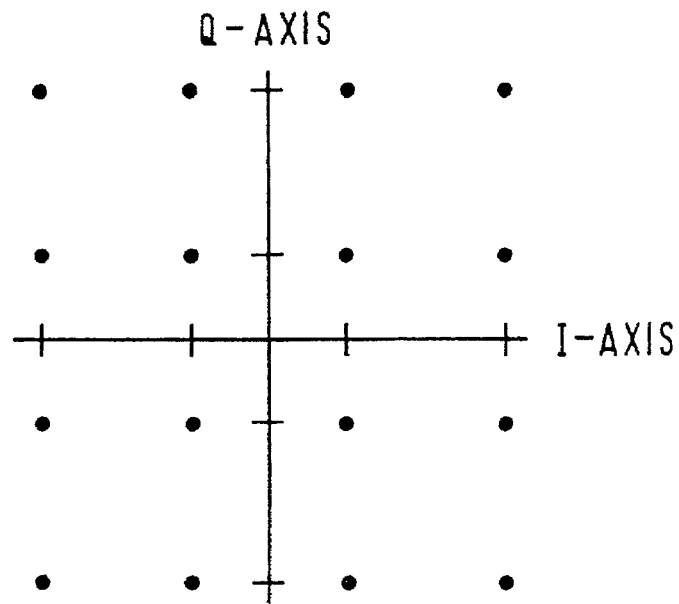
FIGS. 16a–16d illustrates examples of the constellation under other modulation forms.
Figure 16B:
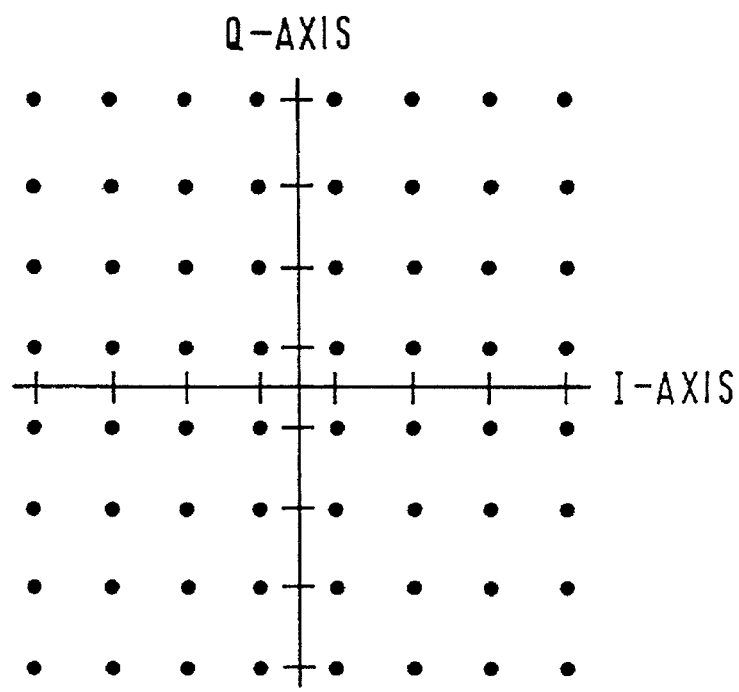
Figure 16C:
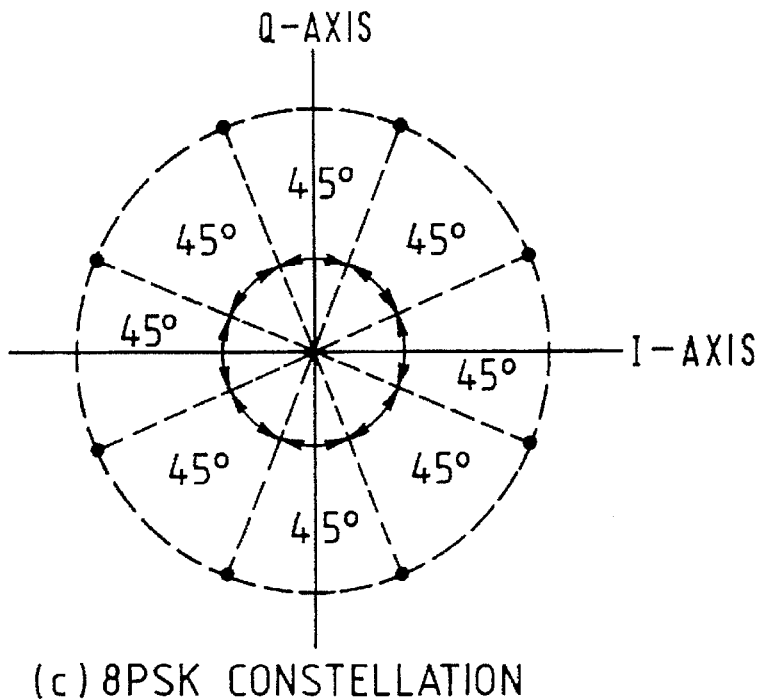
Figure 16D:
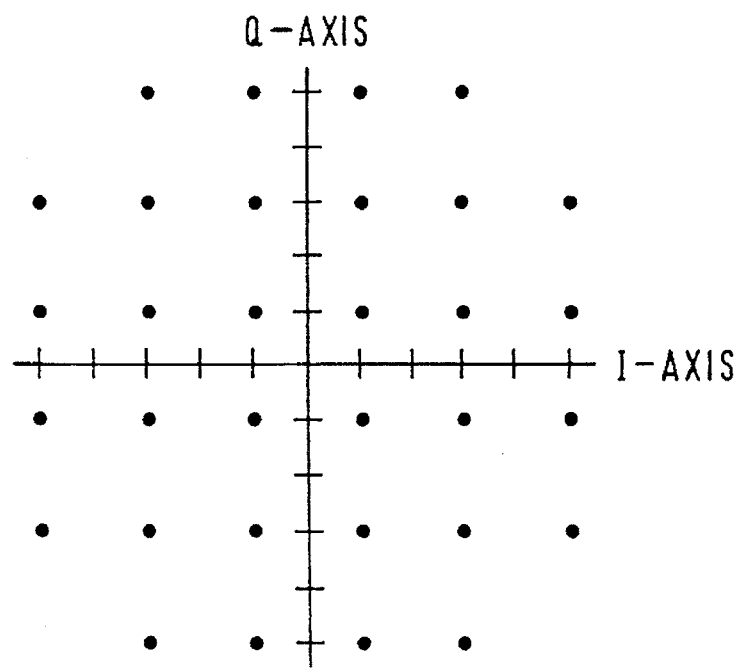

The configuration as shown in FIG. 14 is so designed that only the complex signal in modulation form in the lowest hierarchical layer as separated by at a switch 950 is supplied to the carrier recovery circuit 52. This enables the system to perform the carrier recovery in the modulation form with the lowest multi-valued level, which makes recovery easier.

As described above, the present invention can provide an extremely preferable transmission system which is capable of serving for a stable demodulation as well as transmitters and receivers therefor in the QFDM hierarchical transmission system, even under poor receiving conditions. The present invention can also provide a transmission system which is capable of serving as a stable demodulation of at least lower layers of hierarchical information data by using a differential detection as well as transmitters and receivers therefor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A hierarchical quadrature frequency multiplex signal format including:

multiple layers of hierarchical information data that have been modulated using a plurality of hierarchically graded modulation forms that require C/N ratios that are different from each other, wherein:

the multiple layers of hierarchical information data are formed into a frame, each layer of the multiple layers of hierarchical information data includes a plurality of symbols of the hierarchical information data, the symbols within the layers of the multiple layers of hierarchical information data that have been obtained by using a selected one of the plurality of hierarchically graded modulation forms are interleaved in both a time axis and a frequency axis, and each of the plurality of hierarchically graded modulation forms are associated with a corresponding predetermined carrier.

2. A hierarchical quadrature frequency multiplex signal format as recited in claim 1, wherein the plurality of hierarchically graded modulation forms include a QPSK modulation form, a 16 QAM form, and a 64 QAM form.

3. A hierarchical quadrature frequency multiplex signal format as recited in claim 1, wherein the hierarchical information data includes signals that are differentiated by their degree of importance and are originated from different sources.

4. A hierarchical quadrature frequency multiplex signal format as recited in claim 1, wherein the hierarchical information data includes signals that are differentiated by their degree of importance and are originated from a single source.

5. A hierarchical quadrature frequency multiplex signal format including:

multiple layers of hierarchical information data that have been modulated using a plurality of hierarchically graded modulation forms that require C/N ratios that are different from each other, wherein:

the multiple layers of hierarchical information data are formed into a frame that includes a plurality of symbols of the hierarchical information data, the symbols within layers of the multiple layers of hierarchical information data that have been obtained by using a selected one of the plurality of hierarchically graded modulation forms and are interleaved in both a time axis and a frequency axis, each of the plurality of hierarchically graded modulation forms are associated with a corresponding predetermined carrier, and at least one of the plurality of hierarchically graded modulation forms is differentially encoded.

6. A hierarchical quadrature frequency multiplex signal format as recited in claim 5, wherein the plurality of hierarchically graded modulation forms include a QPSK modulation form, a 16 QAM form, and a 64 QAM form, and wherein the QPSK modulation form is differentially encoded.

7. A hierarchical quadrature frequency multiplex signal format as recited in claim 5, wherein the hierarchical information data includes signals that are differentiated by their degree of importance and are originated from different sources.

8. A hierarchical quadrature frequency multiplex signal format as recited in claim 5, wherein the hierarchical information data includes signals that are differentiated by their degree of importance and are originated from a single source.

9. A hierarchical quadrature frequency multiplex signal transmission apparatus comprising:

means for producing a plurality of modulated signals in which multiple layers of hierarchical information data are associated with a plurality of hierarchically graded modulation forms, each hierarchically graded modulation form conveying a required C/N ratio, wherein the multiple layers of hierarchical information data form a frame and each layer of the multiple layers of hierarchical information data includes symbols of the hierarchical information data;

means for interleaving the symbols within the layers of the multiple layers of the hierarchical information data that have been obtained by using a selected one of the plurality of hierarchically graded modulation forms in both a time axis and a frequency axis; and means for performing an inverse Fourier transform on each symbol, by associating each of the plurality of hierarchically graded modulation forms with a corresponding predetermined carrier.

10. A hierarchical quadrature frequency multiplex signal transmission apparatus comprising:

means for producing a plurality of modulated signals in which multiple layers of hierarchical information data are associated with a plurality of hierarchically graded modulation forms, each hierarchically graded modulation form conveying a required C/N ratio, wherein the multiple layers of hierarchical information data form a frame and each layer of the multiple layers of hierarchical information data includes symbols of the hierarchical information data;

means for interleaving the symbols within the layers of the multiple layers of the hierarchical information data that have been obtained by using a selected one of the plurality of hierarchically graded modulation forms in both a time axis and a frequency axis;

means for differentially encoding one of the hierarchically graded modulation forms; and means for performing an inverse Fourier transform on each symbol, by associating each of the plurality of hierarchically graded modulation forms with a corresponding predetermined carrier.

11. An hierarchical quadrature frequency multiplex signal transmission apparatus as recited in claim 10, wherein the hierarchically graded modulation form that is differentially encoded is the hierarchically graded modulation form having a lowest grade.

12. A hierarchical quadrature frequency multiplex signal receiving apparatus, comprising:

means for receiving and demodulating, so as to produce a demodulated output, signals having multiple layers of hierarchical information data modulated therein by use of a plurality of hierarchically graded modulation forms that have C/N ratios that are different from each other, wherein the multiple layers of hierarchical information data includes a plurality of symbols of the hierarchical information data, the symbols within layers of the multiple layers of the hierarchical information data that have been obtained by using a selected one of the plurality of hierarchically grades modulation forms are interleaved in both a time axis and a frequency axis, each of the plurality of hierarchically graded modulation forms are associated with a corresponding predetermined carrier;

means for performing a Fourier transform for each symbol of the demodulated output and for producing a Fourier transform output;

means for recovering the predetermined carriers using a portion of the Fourier transform output that corresponds to the predetermined carrier that is associated with the hierarchically graded modulation form having a lowest grade;

means for detecting signals associated with all of the hierarchically graded modulation forms using the recovered predetermined carriers;

means for reconstructing at least a portion of the detected signals into a frame;

means for deinterleaving the symbols within the layers of the multiple layers of hierarchical information data that have been obtained by using a selected one of the plurality of hierarchically grades modulation forms in both a time axis and a frequency axis; and means for recovering the hierarchical information data from the respective differing modulation forms deinterleaved symbols.

13. A hierarchical quadrature frequency multiplex signal receiving apparatus, comprising:

means for receiving and demodulating, so as to produce a demodulated output, signals having multiple layers of hierarchical information data modulated therein by use of a plurality of hierarchically graded modulation forms that have C/N ratios that are different from each other, wherein the multiple layers of hierarchical information data includes a plurality of symbols of the hierarchical information data, the symbols within layers of the multiple layers of the hierarchical information data that have been obtained by using a selected one of the plurality of hierarchically graded modulation forms are interleaved in both a time axis and a frequency axis, each of the plurality of hierarchically graded modulation forms are associated with a corresponding predetermined carrier;

means for performing a Fourier transform for each symbol of the demodulated output and for producing a Fourier transform output;

means for recovering the predetermined carriers using a portion of the Fourier transform output that corresponds to the predetermined carrier that is associated with the hierarchically graded modulation form having a lowest grade;

means for detecting, using the recovered predetermined carriers, signals associated with all of the hierarchically graded modulation forms except the hierarchically graded modulation form having the lowest grade;

means for reconstructing at least a portion of the detected signals into a frame;

means for demodulating signals associated with the hierarchically graded modulation form having the lowest grade by performing differential detection;

means for deinterleaving the symbols within layers of the multiple layers of the hierarchical information data that have been obtained by using a selected one of the plurality of hierarchically graded modulation forms in both a time axis and a frequency axis; and means for recovering the hierarchical information data from the respective differing modulation forms deinterleaved symbols.

14. A hierarchical quadrature frequency multiplex signal format including:

a frame comprised of hierarchical information data, wherein, when the hierarchical information data is plotted along a time axis and a frequency axis, a set of carrier regions associated with hierarchically graded modulation forms having a lowest grade, an intermediate grade and a highest grade is repeatedly arranged in the frequency axis direction, wherein the hierarchical information data within a prescribed layer associated with a selected hierarchically graded modulation form are interleaved in both the time axis and the frequency axis, and wherein the hierarchical information data associated with the hierarchically graded modulation form having the lowest grade is differentially encoded.

15. A hierarchical quadrature frequency multiplex signal format as recited in claim 14, wherein the hierarchical information data includes signals that are differentiated by their degree of importance and are originated from different sources.

16. A hierarchical quadrature frequency multiplex signal format as recited in claim 14, wherein the hierarchical information data includes signals that are differentiated by their degree of importance and are originated from a single source.

* * * * *